(12) United States Patent
Yamakawa et al.

(10) Patent No.: US 7,914,704 B2
(45) Date of Patent: *Mar. 29, 2011

(54) BINDER FOR ELECTRIC DOUBLE LAYER CAPACITOR ELECTRODE

(75) Inventors: Masahiro Yamakawa, Tokyo (JP); Hidekazu Mori, Tokyo (JP)

(73) Assignee: Zeon Corporation, Tokyo (JP)

( * ) Notice: Subject to any disclaimer, the term of this patent is extended or adjusted under 35 U.S.C. 154(b) by 306 days.

This patent is subject to a terminal disclaimer.

(21) Appl. No.: 10/567,119

(22) PCT Filed: Aug. 4, 2004

(86) PCT No.: PCT/JP2004/011503
§ 371 (c)(1),
(2), (4) Date: Jan. 18, 2007

(87) PCT Pub. No.: WO2005/013298
PCT Pub. Date: Feb. 10, 2005

(65) Prior Publication Data
US 2008/0011986 A1 Jan. 17, 2008

(30) Foreign Application Priority Data
Aug. 4, 2003 (JP) .................................. 2003-286176

(51) Int. Cl.
*H01G 9/02* (2006.01)
*H01B 1/00* (2006.01)
*H01G 9/00* (2006.01)

(52) U.S. Cl. .................... 252/500; 252/62.2; 361/502

(58) Field of Classification Search ................ 252/62.2, 252/500; 361/502
See application file for complete search history.

(56) References Cited

U.S. PATENT DOCUMENTS

| | | | |
|---|---|---|---|
| 6,341,057 B1 | 1/2002 | Nissen et al. | |
| 6,621,684 B2 * | 9/2003 | Shimamoto et al. | 361/502 |
| 6,656,633 B2 * | 12/2003 | Yamakawa et al. | 429/217 |
| 7,316,864 B2 * | 1/2008 | Nakayama et al. | 429/217 |
| 7,567,429 B2 * | 7/2009 | Mori et al. | 361/502 |
| 2002/0034686 A1 * | 3/2002 | Yamakawa et al. | 429/217 |

FOREIGN PATENT DOCUMENTS

| | | |
|---|---|---|
| JP | 5-3137 | 1/1993 |
| JP | 08107047 A | 4/1996 |
| JP | 08-157677 A | 6/1996 |
| JP | 8-287915 A | 11/1996 |
| JP | 11-162794 A | 6/1999 |
| JP | 2000-208368 A | 7/2000 |
| JP | 2000-299109 A | 10/2000 |
| JP | 2001-307965 A | 11/2001 |
| JP | 2002-110169 | 4/2002 |
| JP | 2002-110169 A | 4/2002 |
| JP | 2002-039518 A1 | 5/2002 |
| JP | 2002-256129 A | 9/2002 |
| JP | 2003-151554 A | 5/2003 |
| WO | WO-98/39808 A1 | 9/1998 |
| WO | WO-01/29917 A1 | 4/2001 |
| WO | WO 03/036744 * | 5/2003 |
| WO | WO-03/36744 A1 | 5/2003 |

OTHER PUBLICATIONS

U.S. Appl. No. 10/549,480 Office Action dated Jan. 18, 2007.
U.S. Appl. No. 10/549,480 Office Action dated Aug. 1, 2007.
U.S. Appl. No. 10/549,480 Office Action dated Apr. 9, 2008.
U.S. Appl. No. 10/549,480 Office Action dated Dec. 15, 2008.
U.S. Appl. No. 10/549,480 Office Action dated Apr. 29, 2009.
U.S. Appl. No. 10/549,480 Office Action dated Nov. 4, 2009.
U.S. Appl. No. 10/549,480 Office Action dated Apr. 26, 2010.

* cited by examiner

*Primary Examiner* — Mark Kopec
*Assistant Examiner* — Jaison P Thomas
(74) *Attorney, Agent, or Firm* — Birch, Stewart, Kolasch & Birch, LLP

(57) ABSTRACT

A binder for an electric double layer capacitor electrode, which includes a copolymer (A) including monomer units derived from at least one compound (a) represented by the following general formula (1): $CH_2=CR^1-COOR^2$ (1) wherein $R^1$ represents a hydrogen atom or a methyl group, and $R^2$ represents an alkyl group or a cycloalkyl group, the glass transition temperature obtained by homopolymerizing the compound (a) being less than 0° C., and monomer units derived from at least one compound (b) selected from acrylic acid alkyl esters, methacrylic acid alkyl esters, aromatic vinyl compounds, and α,β-unsaturated nitrile compounds, the glass transition temperature obtained by homopolymerizing the compound (b) being 0° C. or higher, wherein the total content of the monomer units derived from the compound (a) and those derived from the compound (b) is 90% or more by weight per 100% of the whole copolymer (A), and the glass transition temperature of the copolymer (A) is 10° C. or lower, which binder is excellent in smoothness, crack resistance and binding properties.

5 Claims, No Drawings

BINDER FOR ELECTRIC DOUBLE LAYER CAPACITOR ELECTRODE

TECHNICAL FIELD

The present invention relates to a binder for an electric double layer capacitor electrode; a binder composition for an electric double layer capacitor electrode and a slurry composition for an electric double layer capacitor electrode each of which includes the binder; and an electrode produced by use of the slurry composition, and an electric double layer capacitor having the electrode.

BACKGROUND ART

Regarding electric double layer capacitors using an electric double layer formed at interface of a polarizable electrode and an electrolyte surface, the demand thereof as memory backup electric power sources has been rapidly growing in recent years. Moreover, attention has been paid to the application thereof to articles for which a large capacity is required, such as power sources for electric vehicles.

An electrode for an electric double layer capacitor has a structure wherein an active material for the electrode, such as activated carbon, is bonded to a current collector with a binder. As the binder for an electric double layer capacitor, there is generally used a fluorocarbon polymer such as polytetrafluoroethylene or polyvinylidene fluoride. If the used amount thereof is small, the binding force to the current collector is insufficient. If the used amount is large, a problem that the internal resistance of the electrode increase is caused. The smoothness of electrodes obtained by use of these polymers is insufficient; therefore, there has been a risk that the electrodes become uneven or the electrodes are short-circuited when capacitors are made therefrom. Against the problems, an attempt is made for supplying an electrode excellent in smoothness and binding force by use of a non-fluorine-contained polymer as a binder. For example, Japanese Patent Application Laid-Open (JP-A)-2002-256129 suggests a binder for an electrode wherein a water-dispersible binder resin and a special thermo-reversible thickener are used.

However, an electrode obtained by applying, to a current collector, the binder for an electrode wherein the special thermo-reversible thickener is used is insufficient in binding force and flexibility but is excellent in smoothness. For this reason, when the electrode is wounded so as to be matched with, for example, the shape of a cylindrical capacitor, its electrode layer is easily cracked or fallen off.

DISCLOSURE OF THE INVENTION

Thus, an object of the present invention is to provide a binder, for an electric double layer capacitor electrode, which is excellent in smoothness, crack resistance and binding force; a binder composition for an electric double layer capacitor electrode and a slurry composition for an electric double layer capacitor electrode each of which includes the binder; and an electrode produced by use of the slurry composition, and an electric double layer capacitor having the electrode.

The inventors have found out that an electrode excellent in smoothness, crack resistance and binding force is obtained by using, as a binder, a copolymer obtained by using two monomers, such as two acrylic acid esters, together, a polymer obtained by homopolymerizing one of these monomers giving a glass transition temperature different from that of a polymer obtained by homopolymerizing the other. Based on this finding, the present invention has been made.

Thus, according to a first aspect of the present invention, provided is a binder for an electric double layer capacitor electrode, which includes a copolymer (A) including monomer units derived from at least one compound (a) represented by the following general formula (1): $CH_2=CR^1-COOR^2$ (1) wherein $R^1$ represents a hydrogen atom or a methyl group, and $R^2$ represents an alkyl group or a cycloalkyl group, the glass transition temperature obtained by homopolymerizing the compound (a) being less than 0° C., and monomer units derived from at least one compound (b) selected from acrylic acid alkyl esters, methacrylic acid alkyl esters, aromatic vinyl compounds, and α,β-unsaturated nitrile compounds, the glass transition temperature obtained by homopolymerizing the compound (b) being 0° C. or higher, wherein the total content of the monomer units derived from the compound (a) and those derived from the compound (b) is 90% or more by weight per 100% by weight of the whole copolymer (A), and the glass transition temperature of the copolymer (A) is 10° C. or lower.

It is preferred that the copolymer (A) further includes monomer units derived from an ethylenically unsaturated carboxylic acid (c) in an amount of 0.1 to 10% by weight per 100% by weight of the whole copolymer (A).

It is preferred that $R^2$ in the general formula (1) which represents the compound (a) comprising the copolymer (A) is an alkyl group having 4 to 12 carbon atoms.

According to a second aspect of the present invention, provided is a binder composition for an electric double layer capacitor electrode, wherein the following copolymer (A) is dispersed in water: a copolymer (A) including monomer units derived from at least one compound (a) represented by the following general formula (1): $CH_2=CR^1-COOR^2$ (1) wherein $R^1$ represents a hydrogen atom or a methyl group, and $R^2$ represents an alkyl group or a cycloalkyl group, the glass transition temperature obtained by homopolymerizing the compound (a) being less than 0° C., and monomer units derived from at least one compound (b) selected from acrylic acid alkyl esters, methacrylic acid alkyl esters, aromatic vinyl compounds, and α,β-unsaturated nitrile compounds, the glass transition temperature obtained by homopolymerizing the compound (b) being 0° C. or higher; the total content of the monomer units derived from the compound (a) and those derived from the compound (b) is 90% or more by weight per 100% by weight of the whole copolymer (A); and the glass transition temperature of the copolymer (A) is 10° C. or lower.

It is preferred that the content of alkali metal ions is 0.2% or less by weight per 100% by weight of the copolymer (A).

According to a third aspect of the present invention, provided is a slurry composition for an electric double layer capacitor electrode, which includes: the above-mentioned binder composition for the electric double layer capacitor electrode; and an active material for the electrode.

Preferably, the above-mentioned slurry composition for an electric double layer capacitor electrode further includes a thickener in an amount of 0.5 to 5% by weight per 100% by weight of the active material for the electrode. More preferably, the thickener is a cellulosic polymer.

According to a fourth aspect of the present invention, provided is an electrode for an electric double layer capacitor, wherein an electrode layer including the following copolymer (A) and an active material for the electrode is bonded to a current collector: a copolymer (A) including monomer units derived from at least one compound (a) represented by the following general formula (1): $CH_2=CR^1-COOR^2$ (1)

wherein $R^1$ represents a hydrogen atom or a methyl group, and $R^2$ represents an alkyl group or a cycloalkyl group, the glass transition temperature obtained by homopolymerizing the compound (a) being less than 0° C., and monomer units derived from at least one compound (b) selected from acrylic acid alkyl esters, methacrylic acid alkyl esters, aromatic vinyl compounds, and α,β-unsaturated nitrile compounds, the glass transition temperature obtained by homopolymerizing the compound (b) being 0° C. or higher; the total content of the monomer units derived from the compound (a) and those derived from the compound (b) is 90% or more by weight per 100% by weight of the whole copolymer (A), and the glass transition temperature of the copolymer (A) is 10° C. or lower.

According to a fifth aspect of the present invention, provided is an electric double layer capacitor which includes the above-mentioned electrode for the electric double layer capacitor.

BEST MODES FOR CARRYING OUT THE INVENTION

The present invention will be described in detail hereinafter.

(1) Binder for an Electric Double Layer Capacitor Electrode

A copolymer (A) which is the binder of the present invention for an electric double layer capacitor electrode, which may be referred to merely as the "binder" hereinafter, is a copolymer made from at least one compound (a), at least one compound (b), and a different monomer component which is optionally added, and has a glass transition temperature (Tg) of 10° C. or lower. The binding force of an electrode can be made far higher in the case that the copolymer (A) is used as a binder therefor as compared with the case that a homopolymer having a similar glass transition temperature (for example, polybutyl acrylate) is used.

The glass transition temperature of the copolymer (A) is preferably 0° C. or lower, more preferably from –20 to –50° C. If the glass transition temperature is too low, grains of the binder aggregate easily so that the binder becomes uneven, whereby the binding force thereof may be lowered. Moreover, the binder may cover the surface of an active material so that the internal resistance may increase. Conversely, if the glass transition temperature is too high, the flexibility lowers; consequently, when the resultant electrode is wounded or folded, the electrode is easily cracked.

The following will describe the constituent components of the copolymer (A).

<Compound (a)>

The compound (a) is one of the raw monomers of the copolymer (A), and is a compound represented by the general formula (1): $CH_2=CR^1-COOR^2$ (1), a polymer obtained by homopolymerizing this compound having a glass transition temperature of less than 0° C. In the general formula (1), $R^1$ represents a hydrogen atom or a methyl group, and $R^2$ represents an alkyl group or a cycloalkyl group. $R^2$ is preferably an alkyl group, and the number of carbon atoms therein is preferably from 2 to 18, more preferably from 4 to 12, and in particular preferably from 5 to 10.

Regarding the compound (a) used in the present invention, the glass transition temperature of a polymer obtained by homopolymerizing this compound (a) is less than 0° C., preferably less than –50° C. As the glass transition temperatures of polymers, values described in documents can be used. For example, the glass transition temperatures of acrylic polymers are described in Shin-kobunshi Bunko (transliteration) 7, Introduction to Synthetic Resin for Paint, published by Koubunshi Kankoukai, pp. 168-169.

Specific examples of a compound used as the compound (a) include ethyl acrylate (Tg=–22° C.) (the Tg of a polymer obtained by homopolymerizing the compound, this applies to the following); n-propyl acrylate (Tg=–52° C.); n-butyl acrylate (Tg=–54° C.); isobutyl acrylate (Tg=–24° C.); n-octyl acrylate (Tg=–65° C.); 2-ethylhexyl acrylate (Tg=–85° C.); n-octyl methacrylate (Tg=–20° C.); n-dodecyl methacrylate (Tg=–65° C.); and n-lauryl methacrylate (Tg=–65° C.). These compounds may be used alone or in combination of two or more thereof.

The amount of the monomer units derived from the compound (a) in the copolymer (A) is not particularly limited as long as the glass transition temperature of the copolymer (A) is within the given range. The amount thereof is usually from 50 to 95% by weight per 100% by weight, preferably from 60 to 93% by weight per 100% by weight, and more preferably from 70 to 90% by weight per 100% by weight of the whole copolymer (A).

<Compound (b)>

The compound (b) is one of the starting monomers of the copolymer (A), and is a compound selected from acrylic acid alkyl esters, methacrylic acid alkyl esters, aromatic vinyl compounds, and α,β-unsaturated nitrile compounds, a polymer obtained by homopolymerizing this compound having 0° C. or higher, preferably 20° C. or higher. Of these, preferred is acrylic acid alkyl ester, methacrylic acid alkyl ester, or aromatic vinyl compound since the copolymer (A) to be obtained is excellent in electrolytic solution resistance. Particularly preferred is acrylic acid alkyl ester or methacrylic acid alkyl ester since it is excellent in electrochemical stability.

Specific examples of the acrylic acid alkyl ester, which is used as the compound (b), include methyl acrylate (Tg=+10° C.) (the Tg of a polymer obtained by homopolymerizing the compound, this applies to the following). Specific examples of the methacrylic acid alkyl ester include methyl methacrylate (Tg=+105° C.); ethyl methacrylate (Tg=+65° C.); n-propyl methacrylate (Tg=+35° C.); isopropyl methacrylate (Tg=+81° C.); n-butyl methacrylate (Tg=+20° C.); isobutyl methacrylate (Tg=+53° C.); and t-butyl methacrylate (Tg=+107° C.). Examples of the aromatic vinyl compound include styrene (Tg=+100° C.); 2-methylstyrene (Tg=+136° C.); 3-methylstyrene (Tg=+97° C.); 4-methylstyrene (Tg=+93° C.); α-methylstyrene (Tg=+168° C.) and 2,4-dimethylstyrene (Tg=+112° C.). Examples of the α,β-unsaturated nitrile compound include acrylonitrile (Tg=+130° C.); and methacrylonitrile (Tg=+120° C.). These compounds may be used alone or in combination of two or more thereof.

The amount of the monomer units derived from the compound (b) in the copolymer (A) is not particularly limited as long as the glass transition temperature of the copolymer (A) is within the given range. The amount is usually from 5 to 50% by weight per 100% by weight, preferably from 7 to 40% by weight per 100% by weight, and more preferably from 10 to 30% by weight per 100% by weight of the whole copolymer (A).

The total content of the monomer units derived from the compound (a) and those derived from the compound (b) is 90% or more, preferably 93% or more by weight per 100% by weight of the whole copolymer (A).

<Other Monomer>

As a monomer for the copolymer (A), a monomer component other than the compounds (a) and (b) may also be used, Representative examples of the other component include an ethylenically unsaturated carboxylic acid (c) and a polyfunctional ethylenically unsaturated compound (d).

Examples of the ethylenically unsaturated carboxylic acid (c) include ethylenically unsaturated monocarboxylic acids such as acrylic acid, methacrylic acid, and crotonic acid; and ethylenically unsaturated polycarboxylic acids such as maleic acid, fumaric acid, citraconic acid, mesaconic acid, glutaconic acid, itaconic acid, crotonic acid, and isocrotonic acid. Of these, ethylenically unsaturated monocarboxylic acids such as acrylic acid and methacrylic acid are preferred. The bonding force can be further improved by copolymerizing these. The amount of the monomer units derived from the ethylenically unsaturated carboxylic acid (c) in the copolymer (A) is preferably from 0.1 to 10% by weight, more preferably from 1 to 10% by weight, and even more preferably from 2 to 7% by weight of the whole of the copolymer (A) (the ratio of the weight of the whole being 100% by weight).

Examples of the polyfunctional ethylenically unsaturated compound (d) include dimethacrylates, such as ethylene glycol dimethacrylate, and diethylene glycol dimethacrylate; trimethacrylates, such as trimethylolpropane trimethacrylate; and divinyl compounds such as divinylbenzene. When these are copolymerized, the copolymer (A) can be restrained from being dissolved or swelled with an electrolytic solution. The amount of the polyfunctional ethylenically unsaturated compound (d) in the copolymer (A) is usually 5% or less by weight, preferably 3% or less by weight per 100% by weight of the whole copolymer (A).

It is allowable to use, as another monomer component, a copolymerizable monomer other than the ethylenically unsaturated carboxylic acid (c) and the polyfunctional ethylenically unsaturated compound (d) as long as the advantageous effects of the present invention are not damaged. Examples of the copolymerizable monomer include 1-olefins such as ethylene, propylene, and 1-butene; crotonic acid esters such as methyl crotonate, ethyl crotonate, propyl crotonate, butyl crotonate, isobutyl crotonate, n-amyl crotonate, isoamyl crotonate, n-hexyl crotonate, 2-ethylhexyl crotonate, and hydroxypropyl crotonate; maleic acid diesters such as dimethyl maleate, dibutyl maleate, and di-2-ethylhexyl maleate; fumaric acid diesters such as dimethyl fumarate, and dibutyl fumarate; itaconic acid diesters such as dimethyl itaconate, and dibutyl itaconate; and unsaturated dicarboxylic acid anhydrides such as maleic anhydride, citraconic anhydrate, and itaconic anhydride. These monomers may be used in combination of two or more thereof. The total amount of monomer units derived from these monomers is preferably 10% or less by weight, preferably 5% or less by weight of the whole of the copolymer (A) (the ratio of the weight of the whole being 100% by weight).

<Process for Producing the Copolymer (A)>

The process for producing the copolymer (A) is not particularly limited, and can be obtained by copolymerizing the above-mentioned respective monomers by a known polymerization process such as emulsion polymerization, suspension polymerization, dispersion polymerization or solution polymerization. It is particularly preferred to produce the copolymer (A) by emulsion polymerization since the particle diameter of the copolymer (A) is easily controlled. At this time, it is preferred to decrease the content of alkali metal ions in deionized water for polymerization or use a compound containing no alkali metal as a polymerization subsidiary material such as a polymerization initiator, an emulsifier or a dispersing agent in order to decrease the incorporation of alkali metal ions, which will cause corrosion of a current collector, as much as possible.

Examples of the polymerization initiator containing no alkali metal include ammonium persulfate; and organic peroxides such as benzoyl peroxide and cumene hydroperoxide. These may be used alone or may be made into a redox polymerization initiator wherein a reducing agent containing no alkali metal ion, such as ascorbic acid, is used together. Furthermore, the following can be used; azo compounds such as 2,2'-azoisobutyronitrile, 2,2'-azobis(2,4-dimethylvaleronitrile), 2,2'-azobis(4-methoxy-2,4-dimethylvaleronitrile), dimethyl 2,2'-azobisisobutyrate, and 4,4'-azobis(4-cyanopentanoic acid); and amidine compounds such as 2,2'-azobis(2-aminodipropane)dihydrochloride, 2,2'-azobis(N,N'-dimethyleneisobutylamidine), and 2,2'-azobis (N,N'-dimethyleneisobutylamidine) dihydrochloride. These may be used alone or in combination of two or more thereof. The used amount of the polymerization initiator(s) is from 0.01 to 10 parts by weight, preferably from 0.1 to 5 parts by weight for 100 parts by weight of the whole of the monomers.

Specific examples of the emulsifier containing no alkali metal include nonionic emulsifiers such as polyoxyethylene nonyl phenyl ether, polyoxyethylene sorbitan lauryl ester, and polyoxyethylene-polyoxypropylene block copolymer; and gelatin, maleic anhydride-styrene copolymer, and polyvinyl pyrrolidone. These may be used alone or in combination of two or more thereof. The amount of the added emulsifier(s) can be set at will, and is usually from approximately 0.01 to 10 parts by weight for 100 parts by weight of the whole of the monomers. No dispersing agent may be used depending on conditions for the polymerization.

Moreover, an emulsifier containing an alkali metal may be used, examples of which include sodium benzenesulfonates such as sodium dodecyl benzenesulfonate, and sodium dodecyl phenyl ether sulfonate; sodium alkylsulfonates such as sodium laurysulfonate and sodium tetradodecylsulfonate; sodium sulfosuccinates such as sodium dioctylsulfosuccinate and sodium dihexylsulfosuccinate; sodium salts of aliphatic acids, such as sodium laurate; sodium ethoxysulfates such as sodium polyoxyethylene lauryl ether sulfate, and sodium polyoxyethylene nonyl phenyl ether sulfate; sodium alkyl ether phosphate; and sodium polyacrylate. The used amount thereof is usually 2 parts or less by weight, preferably 1 part or less by weight for 100 parts by weight of the whole of the monomers.

(2) Binder Composition for an Electric Double Layer Capacitor Electrode

The binder composition for an electric double layer capacitor electrode, which may be referred to merely as the "binder composition" hereinafter, according to the present invention is a binder composition wherein the copolymer (A) is dispersed in water. The method for dispersing the copolymer (A) into water is not particularly limited. For example, the copolymer (A) made into a fine particle form by spray drying or comminution is mixed with and dispersed into water in accordance with an ordinary method. When the copolymer (A) is made into an aqueous dispersion by emulsion polymerization, the concentration thereof is adjusted by concentration, dilution or the like if necessary and then the copolymer (A) can be used as the binder composition of the present invention, without being isolated, as it is. The concentration (solid content) of the water-dispersed copolymer (A) in water is usually from 20 to 70% by weight per 100% by weight of the binder composition. The content of alkali metal ions in the binder composition is preferably 0.2% or less by weight per 100% by weight of the copolymer (A) from the viewpoint of the prevention of corrosion of a current collector.

The particle diameter of the copolymer (A) in the binder composition of the present invention is usually from 50 to 1000 nm, preferably from 70 to 800 nm, and more preferably from 100 to 500 nm. If the particle diameter is too large, the binding force may be insufficient. Conversely, if the particle diameter is too small, the copolymer (A) may cover the surface of an active material for an electrode so that the internal resistance may increase. The particle diameter is number-average particle diameter obtained by measuring diameters of 100 polymer particles selected at random from a transmission electron microscopic photograph thereof and then calculating the arithmetic average thereof.

(3) Slurry Composition for an Electric Double Layer Capacitor Electrode

The slurry composition for an electric double layer capacitor electrode, which may be referred to merely as the "slurry" hereinafter, according to the present invention includes the binder composition of the present invention and an active material for an electrode and optionally includes a thickener and an electroconductivity additive.

The active material for an electrode used in the present invention is preferably a carbonaceous material, the specific surface area of which is 30 $m^2$/g or more, preferably from 500 to 5,000 $m^2$/g, and more preferably from 1,000 to 3,000 $m^2$/g. Specific examples of the carbonaceous material include activated carbon, polyacene, carbon whisker, and graphite. Powder or fiber thereof can be used. The active material for an electrode is preferably activated carbon. Specifically, there can be used phenol based, rayon based, acrylic material based, pitch based or coconut husk based activated carbon, or some other activated carbon. There can also be used, as the active material for an electrode, non-porous carbon having carbon microcrystal similar to graphite, the interlayer distance of the carbon microcrystal being enlarged. The carbon is described in JP-A-11-317333, JP-A-2002-25867 and so on. When the active material for an electrode is powder, the particle diameter thereof is preferably from 0.1 to 100 μm, more preferably from 1 to 20 μm. In this case, the electrode for a capacitor to be obtained can be made thin and the electrostatic capacity thereof can also be made high.

The amount of the copolymer (A) in the slurry of the present invention is preferably from 0.1 to 20 parts by weight, more preferably from 0.5 to 10 parts by weight for 100 parts by weight of the active material for an electrode. If the binder amount is too small, the active material for an electrode or the electroconductivity additive falls away easily from the electrode. Conversely, if the amount is too large, the active material for an electrode is covered with the binder so that the internal resistance of the electric double layer capacitor may increase.

The slurry of the present invention preferably contains a thickener. When the slurry contains the thickener, the applicability or fluidity of the slurry is improved. The kind of the thickener is not particularly limited. A water-soluble polymer is preferred. Specific examples of the water-soluble polymer include cellulose polymers, such as carboxymethylcellulose, methylcellulose and hydroxypropylcellulose, ammonium salts thereof, and alkali metal salts thereof; polyacrylic or polymethacrylic acid salts such as sodium polyacrylate or polymethacrylic; and other polymers such as polyvinyl alcohol, polyethylene oxide, polyvinyl pyrrolidone, copolymer made from acrylic acid or an acrylic acid salt and vinyl alcohol, copolymer made from maleic anhydride, maleic acid or fumaric acid and vinyl alcohol, modified polyvinyl alcohol, modified polyacrylic acid, polyethylene glycol, polycarboxylic acid, oxidized starch, phosphorylated starch, casein, and various modified starches. Of these, cellulose polymers and salts thereof are preferably used. Ammonium salts of cellulose polymers are more preferred. The used amount of the thickener(s) is preferably from 0.5 to 5 parts by weight for 100 parts by weight of the active material for an electrode.

The slurry of the present invention preferably contains an electroconductivity additive. There can be used, as the electroconductivity additive, electroconductive carbon such as acetylene black, KETJENBLACK, or carbon black. These are used in the form of a mixture with the active material for an electrode. When the electroconductivity additive is used together with the active material, electric contact between particles of the active material for an electrode is further improved so that the internal resistance of the electric double layer capacitor becomes low and further the capacity density can be made high. The used amount of the electroconductivity additive is usually from 0.1 to 20 parts by weight, preferably from 2 to 10 parts by weight for 100 parts by weight of the active material for an electrode.

The slurry of the present invention may contain a small amount of a water-insoluble polymer other than the copolymer (A) as long as the advantageous effects of the present invention are not damaged. Examples of the water-insoluble polymer include nitrile polymers such as acrylonitrile/1-olefin copolymer, acrylonitrile/butadiene rubber and hydrogenated products thereof; diene polymers such as polybutadiene, and styrene/butadiene copolymer; ethylene polymers such as ethylene/acrylic acid ester copolymer, and ethylene/propylene/non-conjugated diene copolymer; and fluorocarbon polymers such as polyvinylidene fluoride, and polytetrafluoroethylene.

The slurry of the present invention can be produced by mixing a binder composition of the present invention, an active material for an electrode, an optional thickener, and an optional electroconductivity additive by means of a mixer. The mixer that can be used is a ball mill, a sand mill, a pigment disperser, a crusher, an ultrasonic disperser, a homogenizer, a planetary mixer, or the like. The method for the mixing and the mixing order are not particularly limited. Preferably, an aqueous solution of the thickener and the electroconductivity additive are mixed to disperse the electroconductivity additive into the form of fine particles; thereafter, thereto are added the active material for an electrode and the binder composition; and the components are homogeneously mixed. Alternatively, preferably, the active material for an electrode and the electroconductivity additive are first mixed by means of a mixer such as a crusher, a planetary mixer, a Henschel mixer, or an omni mixer; next, an aqueous solution of the thickener is added thereto, and the active material for an electrode and the electroconductivity additive are homogeneously dispersed; and the binder composition is added thereto, and then the components are homogeneously mixed. The adoption of these methods makes it possible to yield a homogeneous slurry easily.

(4) Electrode for an Electric Double Layer Capacitor

The electrode for an electric double layer capacitor of the present invention is an electrode wherein an electrode layer including the copolymer (A) and the above-mentioned active material for the electrode is bonded to a current collector. The current collector is not particularly limited as long as the collector is made of a material having electroconductivity and electrochemical endurance. The material is preferably a metal material such as aluminum, titanium, tantalum, stainless steel, gold, platinum or the like, and is in particular preferably aluminum or platinum since the material has heat resistance. The shape of the current collector is not particularly limited. Usually, a current collector in the form of a sheet having a thickness of about 0.001 to 0.5 mm is used.

The electrode of the present invention can be produced by wet molding or dry molding. The wet molding is a method of applying the slurry of the present invention onto the current collector and drying the slurry, thereby producing the electrode. The method for applying the slurry onto the current collector is not particularly limited. Examples thereof include doctor blade, dipping, reverse rolling, direct rolling, gravure, extrusion, and brush coating methods. The viscosity of the slurry is varied in accordance with the kind of an applicator therefor or the shape of lines to be applied, and is usually from 100 to 100,000 mPa·s, preferably from 1,000 to 50,000 mPa·s, and more preferably from 5,000 to 20,000 mPa·s. The amount of the applied slurry is not particularly limited, and is generally such an amount that the thickness of an electrode layer which is to be formed after the slurry is dried and is made of the active material for the electrode, the binder and the like will be set usually into the range of 0.005 to 5 mm, preferably into the range of 0.01 to 2 mm. Examples of the method for the drying include drying with warm wind, hot wind or low moist wind, vacuum drying, and drying by the radiation of (far) infrared rays, an electron beam, or the like. The drying temperature is usually from 150 to 250° C. The density of the active material for the electrode may be made high by pressing the dried current collector. The method for the pressing may be mold pressing, roll pressing or the like.

The method for the dry molding is not particularly limited, and specific examples thereof include press forming, powder forming, and extrusion molding. The press forming is a method of pressing the copolymer (A) and the active material for the electrode inside a mold or on a belt to rearrange, deform or break these components, thereby making the components dense to form an electrode layer.

The powder forming is a method of making the copolymer (A) and the active material for the electrode into a powdery form, scattering the powder onto the current collector, and heating this up to a temperature of the Tg of the copolymer (A) or higher, thereby forming a film-form electrode layer onto the current collector.

The extrusion molding is a method of supplying the copolymer (A) and the active material for the electrode into an extruder, and making the components into an endless long product in a film or sheet form, thereby forming an electrode layer continuously.

In order to remove unevenness in the thickness of the formed electrode and make the density of the electrode layer higher to make the capacity of the electric double layer capacitor higher, the formed electrode may be subjected to post-pressing if necessary.

The method for the post-pressing is generally performed with the step of pressing with rolls. In the pressing step, two columnar rolls are arranged in parallel along the vertical direction at a small interval, the rolls are rotated in opposite directions and then the electrode is sandwiched therebetween, thereby pressing the electrode. The rolls may be subjected to temperature-adjustment by heating or cooling.

(5) Electric Double Layer Capacitor

The electric double layer capacitor of the present invention is an electric double layer capacitor having the electrode for an electric double layer capacitor of the present invention. The electric double layer capacitor can be produced by an ordinary method using a plurality of the above-mentioned electrodes, an electrolytic solution, and members such as a separator. Specifically, for example, the electrodes are stacked so as to interpose the separator therebetween. This is wounded or folded in accordance with the shape of a capacitor, and put into a container. The electrolytic solution is poured into the container, and the container is sealed up, thereby producing the electric double layer capacitor.

The separator which can be used is a known separator such as a microporous membrane or nonwoven cloth made of a polyolefin such as polyethylene or polypropylene, or a porous film which is made mainly of pulp and generally called electrolytic capacitor paper. Instead of the separator, a solid electrolyte or a gel electrolyte may be used.

The electrolytic solution is not particularly limited, and is preferably a non-aqueous electrolytic solution in which an electrolyte is dissolved in an organic solvent since it has a high voltage resistance.

The electrolyte which can be used is any known electrolyte. Examples thereof include tetraethylammonium tetrafluoroborate, triethylmonomethylammonium tetrafluoroborate, and tetraethylammonium hexafluorophosphate.

The solvent (electrolyte solvent) in which these electrolytes are dissolved is not particularly limited if the solvent is a solvent which is generally used as an electrolyte solvent. Specific examples thereof include propylene carbonate, ethylene carbonate, butylene carbonate, γ-butyrolactone, sulfolane, and acetonitrile. These may be used alone or in the form of a mixed solvent composed of two or more thereof. Of these, carbonates are preferred. The concentration of the electrolytic solution is usually 0.5 mol/L or more, preferably 0.8 mol/L or more.

EXAMPLES

The present invention will be described by way of the following examples. However, the present invention is not limited thereto. In the examples, "part(s)" and "%" represent "part(s) by weight" and "% by weight", respectively, unless otherwise specified.

Example 1

The following were charged into a reaction vessel with a stirrer; 100 parts of a monomer mixture having a composition shown in Table 1, 0.7 part of sodium dodecylbenzenesulfonate, 250 parts of ion-exchanged water, and 1.5 parts of ammonium persulfate. The solution was sufficiently stirred. Thereafter, the given components were polymerized at 80° C. for 5 hours to yield a latex having a solid content of about 30%. The polymerization conversion degree thereof was 95%, and the composition ratio of the polymer was consistent with the ratio between the charged monomers. Ammonia water was added to this latex to set the pH to 7. Thereafter, the latex was concentrated under reduced pressure to remove the remaining monomers, thereby yielding a binder composition as a latex (a binder dispersion in water) having a solid content of 40%. The amount of alkali metal ions measured by inductively coupled plasma emission spectrometry (ICP) was 0.1% by weight of the copolymer (the ratio of the weight of the copolymer being 100%).

Next, 100 parts of high-purity activated carbon powder (specific surface area: 2000 $m^2/g$, and average particle diameter: 8 μm) as an active material for an electrode, and 1.5 parts of KETJENBLACK and 3 parts of acetylene black as electroconductivity additive were mixed, and the mixture was added to 12.5 parts of the binder composition. Thereto were further added 2 parts of an ammonium salt of carboxymethylcellulose (CMC Daicel DN-10L, manufactured by Daicel Chemical Industries, Ltd.) as a thickener. Water was added thereto so as to set the concentration of all solids to 43%. The components were mixed by means of a planetary mixer for 60 minutes. Thereafter, the mixture was diluted with water to set the solid concentration to 41%, and further the components were mixed for 10 minutes to yield a slurry for an electrode.

This slurry was applied onto an aluminum foil of 20 μm thickness with a doctor blade. The resultant was dried with a blast drier at 80° C. for 30 minutes. Thereafter, the dried product was pressed with a roll press machine to yield an electrode of 80 μm in thickness, having an electrode layer of 0.6 g/cm³ density.

The electrode produced through the above-mentioned steps was cut out into two circles of 15 mm diameter. The circles were dried at 200° C. for 72 hours. The electrode layer faces of the two electrodes were made opposite to each other, and then a circular separator, 18 mm in diameter and 40 μm in thickness, made of cellulose was sandwiched therebetween. This was put into a coin-shaped outer packaging container (diameter: 20 mm, height: 1.8 mm, and stainless steel thickness: 0.25 mm) made of stainless steel, to which a packing made of polypropylene was fitted. An electrolytic solution was poured into this container without leaving air. A cap of 0.2 mm in thickness, made of stainless steel was put and fixed onto the outer packaging container through the polypropylene packing. The container was then sealed to produce a coin-shaped electric double layer capacitor of 20 mm in diameter and about 2 mm in thickness. The used electrolytic solution was a solution in which tetraethylammonium tetrafluoroborate was dissolved in propylene carbonate at a concentration of 1 mol/L.

Examples 2 to 6, and Comparative Examples 1 to 2

Each binder composition, each slurry for an electrode, each electrode, and each electric double layer capacitor were produced in the same way as in Example 1 except that each monomer mixture shown in Table 1 was used as a monomer mixture.

(Methods for Tests and Evaluations)
(1) Physical Properties of the Binders

Physical properties of the polymers used in Examples 1 to 6 and Comparative Examples 1 to 2, which were each used as the binder, were measured by the following methods.

<Composition Ratio of the Polymers>

The content by percentage (composition ratio) of each of the monomer units in each of the polymers was obtained by $^1$H- and $^{13}$C-NMR measurements. The results are shown in Table 1.

<Glass Transition Temperature (Tg) of the Polymers>

Each of the polymers was cast onto a polytetrafluoroethylene plate, and dried for 2 days. Thereafter, the polymer was further dried at 120° C. for 15 minutes to produce a polymer film. The film was used, and the temperature thereof was raised at 5° C. per minute to measure the Tg with a differential scanning calorimeter (DSC). The results are shown in Table 1.

<Particle Diameter of the Polymers>

The particle diameter of each of the polymers was gained as the number-average particle diameter thereof, which was obtained by measuring the diameters of 100 particles of the polymer selected at random in transmission electron microscopic photographs thereof and then calculating the arithmetic average of the diameters. The results are shown in Table 1.

<Electrolytic Solution Resistance (the Electrolytic Solution Swelling Ratio (Magnification) of the Polymers)>

Each of the binder compositions was applied onto a glass plate to give a polymer film of about 0.1 mm thickness. Thereafter, the resultant was naturally dried at room temperature for 24 hours. Furthermore, the resultant was vacuum-dried at 120° C. for 2 hours to form a cast film. This cast film was cut out into a piece of about 2 cm square. The piece was weighed and then immersed into an electrolytic solution of 60° C. temperature. The immersed film was pulled up after 72 hours, and wiped with towel paper. Immediately, the weight of the film was measured. The value of (the weight after the immersion)/(the weight before the immersion) was defined as the electrolytic solution swelling ratio. The used electrolytic solution was a solution in which tetraethylammonium tetrafluoroborate was dissolved in propylene carbonate at a concentration of 1 mol/L. As the electrolytic solution swelling ratio is smaller, the electrolytic solution resistance of the binder polymer is higher. The results are shown in Table 2.

(2) Performances of the Electrodes and the Electric Double Layer Capacitors

Regarding performances of the electrodes and the electric double layer capacitors produced in Examples 1 to 6 and Comparative Examples 1 to 2, the following evaluations were made. The results are shown in Table 2.

<Smoothness>

In accordance with JIS B0601, the arithmetic average roughness (Ra) of a surface 20 μm square of each of the electrode layers was observed with an atomic force microscope. (The electrode before the roll pressing was measured.)

<Peel Strength>

Each of the electrodes was cut out into a rectangle of 2.5 cm width and 10 cm length. The rectangular piece was fixed to direct its electrode layer face upwards. A cellophane tape was stuck onto the electrode layer face. The tape was peeled at a speed of 50 mm/minute in the direction of an angle of 180°. The stress (N/cm) in this case was measured 10 times. The average thereof was defined as the peel strength. As this value is larger, the binding strength is higher and the active material for the electrode is less peeled from the current collector.

<Cracking Resistance>

Each of the electrodes was cut into rectangles of 3 cm width and 9 cm length. The rectangular pieces were used as test pieces. One out of the test pieces was put on a desk to direct the current collector side face of the test piece downwards. A stainless steel bar of 3 mm diameter was set onto the current collector side surface thereof in the state that the bar was positioned at the center of the piece in the longitudinal direction (at a place 4.5 cm apart from ends thereof) and was laid along the short direction. The test piece was bent at an angle of 180° around this stainless steel rod so as to direct the electrode layer outwards. This test was made on the test pieces, the number of which was ten. It was observed whether or not the portion where the electrode layer of each of the test pieces was bent was cracked or peeled. The case that no cracking or peeling was generated in any one of the 10 pieces was judged to be good (o), and the case that one or more spots were cracked or peeled in one or more of the pieces was judged to be poor (X). When the electrode layer is not cracked or peeled, the electrode is excellent in flexibility.

(Internal Resistance)

At 25° C., each of the electric double layer capacitors was charged up to 2.7 V from 0 V at a constant current of 10 mA/cm² over 10 minutes, and then discharged up to 0 V at a constant current of 1 mA/cm². The internal resistance was calculated from the resultant charging and discharging curve in accordance with a calculating method of the standard RC-2377 prescribed by Japan Electronics and Information Technology Industries Association.

TABLE 1

| | Binder composition (number inside parentheses: % by weight) | | | | Particle |
|---|---|---|---|---|---|
| | Compound (a) | Compound (b) | Other monomer | Tg (° C.) | diameter (nm) |
| Example 1 | 2EHA (83) | AN (15) | MAA (2) | −44 | 130 |
| Example 2 | 2EHA (78) | MMA (20) | MAA (2) | −40 | 110 |
| Example 3 | BA (88) | MMA (10) | MAA (2) | −27 | 150 |
| Example 4 | 2EHA (68) | ST (30) | MAA (2) | −32 | 120 |
| Example 5 | 2EHA (73) | MMA (25) | EGDMA (2) | −34 | 110 |
| Example 6 | 2EHA (78) | ST (20) | EGDMA (2) | −41 | 110 |
| Comparative Example 1 | BA (45) | MMA (46) | MAA (4) | 28 | 100 |
| Comparative Example 2 | BA (96) | — | MAA (4) | −47 | 110 |

(Abbreviations in Table 1 have the following meanings. 2EHA: 2-ethylhexylacrylate, AN: acrylonitrile, MAA: methacrylic acid, BA: n-butyl acrylate, ST: styrene, and EGDMA: ethylene glycol dimethacrylate)

TABLE 2

| | Smoothness (Ra: μm) | Cracking resistance | Peel strength (N/cm) | Internal resistance (Ω) | Electrolytic solution resistance (magnifications) |
|---|---|---|---|---|---|
| Example 1 | 1.4 | ◯ | 0.1 | 3.3 | 1.4 |
| Example 2 | 1.6 | ◯ | 0.13 | 3.2 | 1.1 |
| Example 3 | 1.4 | ◯ | 0.15 | 3.4 | 1.3 |
| Example 4 | 1.5 | ◯ | 0.12 | 3.1 | 1.2 |
| Example 5 | 1.5 | ◯ | 0.13 | 3.2 | 1.1 |
| Example 6 | 1.5 | ◯ | 0.11 | 3.2 | 1.1 |
| Comparative Example 1 | 1.6 | X | 0.05 | 3.6 | 1.4 |
| Comparative Example 2 | 1.5 | X | 0.02 | 3.8 | 1.3 |

As is evident from Table 2, the electrodes of the present invention were excellent in cracking resistance and peel strength. Furthermore, the electric double layer capacitors produced by use of the electrodes also had a small internal resistance, and excellent performances for electric double layer capacitors. On the other hand, the electrodes using the binder having an excessively high glass transition temperature (Comparative Example 1) and using the binder having no monomer units derived from the compound (b) (Comparative Example 2) were poor in both of crack resistance and peel strength, and the performances of the electric double layer capacitors obtained therefrom were also poor.

The above has described the present invention in connection with embodiments which appear to be most preferable and most practical at present. However, the present invention is not limited to the embodiments disclosed in the present specification, and can be appropriately modified within the scope which does not depart from the subject matter or the conception of the present invention which can be understood from the claims and the whole of the specification. It should be understood that binders for electric double layer capacitor electrodes, binder compositions, slurry compositions, electrodes, and electric double layer capacitors with such modification are also included in the technical scope of the present invention.

INDUSTRIAL APPLICABILITY

The electrode, for an electric double layer capacitor, produced by use of a slurry composition, for an electric double layer capacitor electrode, which contains the binder composition of the present invention for an electric double layer capacitor electrode is excellent in smoothness, cracking resistance, and binding force. The use of this electrode for an electric double layer capacitor makes it possible to produce a superior electric double layer capacitor.

The invention claimed is:
1. An electric double layer capacitor, comprising an electrode and an electrolyte for the electric double layer capacitor, wherein an electrode layer comprising the following copolymer (A) and an active material for the electrode is bonded to a current collector:
   a copolymer (A) comprising:
      monomer units derived from at least one compound (a) represented by the following general formula (1):

$$CH_2=CR^1COOR^2 \qquad (1)$$

wherein $R^1$ represents a hydrogen atom or a methyl group, and $R^2$ represents an alkyl group or a cycloalkyl group, the glass transition temperature obtained by homopolymerizing the compound (a) being less than 0° C., and
      monomer units derived from at least one compound (b) selected from acrylic acid alkyl esters, methacrylic acid alkyl esters, aromatic vinyl compounds, and acrylonitrile, the glass transition temperature obtained by homopolymerizing the compound (b) being 0° C. or higher;
   wherein the total content of the monomer units derived from the compound (a) and those derived from the compound (b) is 90% or more by weight per 100% by weight of the whole copolymer (A); and
   wherein the amount of the monomer units derived from the compound (a) in the copolymer (A) is 50 to 95% by weight per 100% by weight of the whole copolymer (A), and the amount of the monomer units derived from the compound (b) in the copolymer (A) is 5 to 50% by weight per 100% by weight of the whole copolymer (A), and
   the glass transition temperature of the copolymer (A) is 10° C. or lower, wherein the electrolyte includes tetraethylammonium tetrafluoroborate, triethylmonomethylammonium tetrafluoroborate, or tetraethylammonium hexafluorophosphate.

2. The electric double layer capacitor according to claim 1, wherein the copolymer (A) further comprises monomer units derived from an ethylenically unsaturated carboxylic acid (c) in an amount of 0.1 to 10% by weight per 100% by weight of the whole copolymer (A).

3. The electric double layer capacitor according to claim 1, wherein $R^2$ in the general formula (I) is an alkyl group having 4 to 12 carbon atoms.

4. The electric double layer capacitor according to claim 1, wherein the electrode layer further comprises a thickener in an amount of 0.5 to 5% by weight per 100% by weight of the active material for the electrode.

5. The electric double layer capacitor according to claim 4, wherein the thickener is a cellulosic polymer.

* * * * *